US007917502B2

(12) United States Patent
Cheng et al.

(10) Patent No.: US 7,917,502 B2
(45) Date of Patent: Mar. 29, 2011

(54) OPTIMIZED COLLECTION OF JUST-IN-TIME STATISTICS FOR DATABASE QUERY OPTIMIZATION

(75) Inventors: Qi Cheng, North York (CA); John Frederick Hornibrook, Markham (CA); Wing Yan Lau, Toronto (CA); Ivan Popivanov, Markham (CA); Xiaoyan Qian, Aurora (CA); Michael Joshua Snowbell, Thornhill (CA); Michael Arthur Franciscus Stuy, Markham (CA); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 12/038,054

(22) Filed: Feb. 27, 2008

(65) Prior Publication Data
US 2009/0216709 A1 Aug. 27, 2009

(51) Int. Cl.
G06F 7/00 (2006.01)
G06F 17/30 (2006.01)
(52) U.S. Cl. ........................ 707/718; 707/803
(58) Field of Classification Search .............. 707/713, 707/999.002, 999.101, 999.102, 718, 803
See application file for complete search history.

(56) References Cited

U.S. PATENT DOCUMENTS

| 6,847,978 | B2 * | 1/2005 | Ellis et al. .................. 707/713 |
| 2004/0236722 | A1 * | 11/2004 | Waas et al. .................. 707/2 |
| 2004/0243555 | A1 * | 12/2004 | Bolsius et al. .................. 707/3 |
| 2005/0108199 | A1 | 5/2005 | Ellis et al. |
| 2006/0230016 | A1 | 10/2006 | Cunningham et al. |
| 2006/0294058 | A1 * | 12/2006 | Zabback et al. .................. 707/2 |
| 2007/0050330 | A1 * | 3/2007 | Karn et al. .................. 707/2 |
| 2007/0185912 | A1 * | 8/2007 | Gupta et al. .................. 707/200 |
| 2008/0133458 | A1 * | 6/2008 | Zabback et al. .................. 707/2 |
| 2008/0177694 | A1 * | 7/2008 | Chaudhuri et al. .................. 707/2 |
| 2008/0256025 | A1 * | 10/2008 | Bestgen et al. .................. 707/2 |
| 2008/0275840 | A1 * | 11/2008 | Burger et al. .................. 707/2 |
| 2009/0100114 | A1 * | 4/2009 | Bestgen et al. .................. 707/204 |

OTHER PUBLICATIONS

Wikipedia, Computer Data Storage, printout from Web archive: http://web.archive.org/web/20071026074644/http://en.wikipedia.org/wiki/Computer_data_storage, Oct. 24, 2007, 10 pages.*
El-Helw, A., et al.; "Collecting and Maintaining Just-In-Time Statistics"; IEEE 23rd International Conference on Data Engineering (ICDE 2007), Apr. 15-20, 2007; 11 pages.

* cited by examiner

Primary Examiner — Jean B. Fleurantin
Assistant Examiner — Phong Nguyen
(74) Attorney, Agent, or Firm — Sughrue Mion, PLLC (57) ABSTRACT

A system and method are provided for updating database statistics for use in generating query execution plans. A first query for a database is received, for example by a compiler, and the compiler accesses statistics associated with the first query for optimizing a query execution plan for the first query. The statistics may be accessed from a first cache. If the statistics retrieved from the first cache are determined to be stale, the system obtains updated statistics and may store them in a temporary cache. The stale statistics in the first cache are marked as invalid. Existing queries using the first cache may continue to use the first cache, while new queries may be provided with updated statistics.

22 Claims, 7 Drawing Sheets

OPTIMIZED COLLECTION OF JUST-IN-TIME STATISTICS FOR DATABASE QUERY OPTIMIZATION

TECHNICAL FIELD

This invention relates generally to database management systems implemented in computer systems, and in particular to statistics collection for optimizing queries.

DESCRIPTION OF THE RELATED ART

Database query optimizers in database systems rely on statistics (for example, the number of rows in a table, the number of distinct values in a column, the most frequently-occurring values in a column, the distribution of data values in a column, and the like) that characterize the data in order to choose appropriate query execution plans to retrieve data needed to answer queries. These statistics may be determined from an inspection of the tables of the database, or from a set of stored statistical values.

When statistical values are stored, the actual statistics of the current database may differ from the stored statistics, because the stored statistical values may not be updated during data manipulations such as insert, update, delete, and load, because updating the stored statistical values during such data manipulations may not be an efficient use of the database system resources. However, the use of inaccurate or outdated database statistics may result in less optimal query execution plans and longer query processing times.

SUMMARY OF THE INVENTION

In accordance with a first aspect of the embodiments described herein, there is provided a method for updating database statistics for use in generating query execution plans, comprising receiving a first query for a database; determining whether valid and updated statistics for compiling the first query are available from a first store comprising statistics associated with the database; and if valid and updated statistics for compiling the first query are not available from the first store, obtaining updated statistics from a further store comprising statistics associated with the database.

In accordance with a further aspect, there is provided a method for updating database statistics for a database table distributed over a plurality of partitions, each of the plurality of partitions comprising a statistic value associated with each partition of the database table, the method comprising maintaining a cached version of each statistic value associated with each partition of the database table on each partition where a query relating to the database table may be compiled; determining whether the cached version of a statistic value on a first partition is expired; if the cached version of the statistic value on the first partition is expired, obtaining an updated statistic value from the plurality of partitions; and storing the updated statistic value as the cached version of the statistic value on the first partition.

In still a further aspect, there is provided a system for updating database statistics for use in generating query execution plans, the system comprising a database; a first store comprising statistics associated with the database; a second store comprising statistics associated with the database; and a compiler in communication with the database and with at least the first store, the compiler being configured for receiving queries for the database, accessing statistics for compiling each query from at least the first store, and generating at least one query execution plan for executing each query, wherein the compiler is further configured to: determine whether valid and updated statistics for compiling a first query are available from the first store; and if valid and updated statistics for compiling the first query are not available from the first store, obtain updated statistics from the second store.

There is also provided a computer program product comprising a computer-readable medium, the computer-readable medium being encoded with a computer program for updating database statistics, wherein the computer program, when executed on a computer system, causes the computer system to receive a first query for a database; determine whether valid and updated statistics for compiling the first query are available from a first store comprising statistics associated with the database; if valid and updated statistics for compiling the first query are not available from the first store, obtain updated statistics from a further store comprising statistics associated with the database.

BRIEF DESCRIPTION OF THE DRAWINGS

In drawings which illustrate by way of example only a preferred embodiment of the invention.

DETAILED DESCRIPTION

The embodiments described below relate to a relational database management system or systems (DBMS), and to statistics collection for optimizing queries in a DBMS. Computer systems comprising DBMS software using a Structured Query Language (SQL) interface are well known in the art. One example is the DB2® data server from International Business Machines Corp., Armonk, N.Y. The SQL interface has been adopted as a standard by both the American National Standards Institute (ANSI) and the International Standards Organization (ISO), although some DBMS also comprise proprietary extensions. Such standards, and proprietary extensions, are known to those of ordinary skill in the art.

Figure 1:
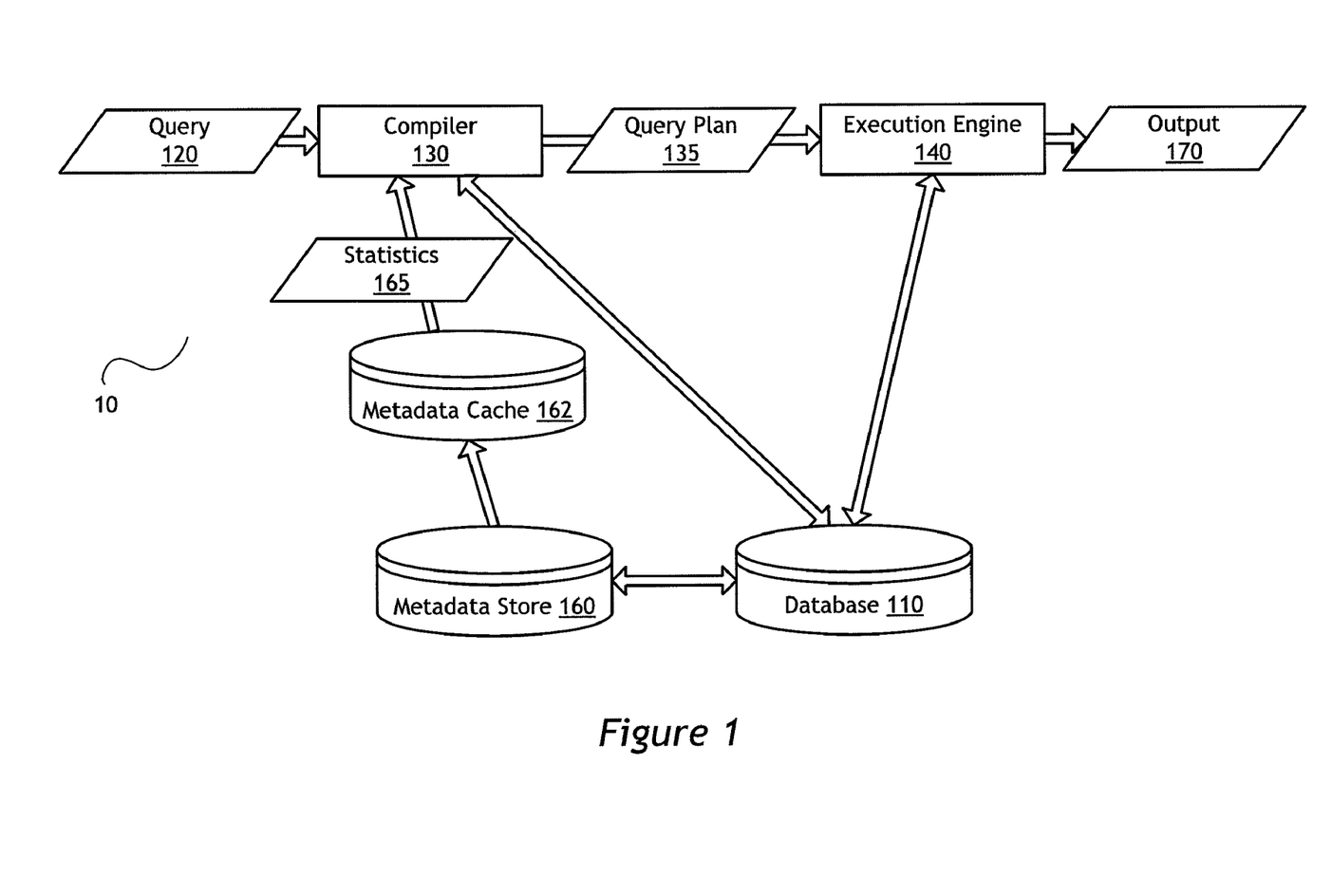
FIG. 1 is a schematic representation of a database management system comprising a metadata store.

A process for handling queries in a DBMS 10 is shown in FIG. 1. The DBMS 10 comprises at least one database 110, which may be distributed across one or more partitions within the system 10. The database 110 may comprise one or more tables (not shown in FIG. 1). The database 110 is in communication with a compiler 130, an execution engine 140, and optionally with a metadata store 160 that may store statistics and other metadata relating to the database 110.

As shown in FIG. 1, a query 120 is received at the compiler 130 for optimization. The query 120 may have originated within the DBMS 10, or from a client, not shown, in communication with the DBMS 10. The client may comprise a client application such as an online analytical processing application, and may be remotely located from the DBMS 10. Further, the query 120 may be a simple query requiring data from a single table of the database 110, or it may be a complex query including joined tables, aggregate functions, or predicates, or a combination of one or more of these items.

The compiler 130 compiles, using the query 120, a query execution plan or access plan 135. The compiler 130 may comprise a query optimizer that analyzes statistics associated with the tables targeted by the query 120 in order to select an appropriate query execution plan 135 from among a number of possible query execution plans. An appropriate or good query execution plan 135 is typically one that involves the least estimated cost, based on the statistics available to the compiler 130. For example, the query optimizer may use the statistics to estimate the cardinality (i.e., the number of rows processed) at each intermediate step of each query execution plan in order to estimate the total cost of each plan, and select the query execution plan with the lowest associated cost. Once the query execution plan 135 is compiled, it is provided to the execution engine 140. The execution engine 140 then executes the query 120, accessing the database 110 and the target tables therein according to the query execution plan 135. The output 170 from the execution engine 140 is the result set produced by the execution engine. This output 170 may then be provided to the client that had submitted the query 120, or to a different destination such as an output interface (e.g., a display screen) or a storage unit (e.g., a computer memory), not shown.

The query optimizer of the compiler 130 may obtain statistics relating to the target tables of the database 110 directly from the database 110, in which case a process computes the needed statistics directly from the database 110, or directly or indirectly from the metadata store 160. Obtaining statistics from the metadata store 160 is generally more efficient than computing statistics directly from the database 110, The metadata store 160 may comprise special system tables, or system catalog tables, within the database 110 itself, and may comprise metadata relating to the database 110 beyond statistics for the database 110. The metadata store 160 may further comprise statistics relating to other metadata for the database 110. In another embodiment, the metadata store 160 may be comprised in a separate store or memory location from the database 110. Either the contents of the metadata store 160, or a subset of statistics and optionally other metadata from the metadata store 160, may be loaded from the metadata store 160 into a metadata cache 162, which may be stored in a memory location accessible to all users and processes of the DBMS 10. The compiler 130 may therefore obtain statistics 165 from the metadata cache 162, rather than directly from the metadata store 160. However, sometimes any statistics relevant to the query 120 in the metadata cache 162 cached from the metadata store 160 are not accurate or up-to-date, and the actual, real-time statistics of the tables in the database 110 in the metadata cache 162 and metadata store 160 may differ from the stored values due to updates that took place on the database table data since the statistics were last collected. Database statistics may not be incrementally updated in the metadata store 160 or cache 162 during data manipulations such as insert, update, delete and load, if such incremental maintenance is too expensive in the operation of the DBMS 10. The presence of inaccurate or outdated statistics may cause the query optimizer to inaccurately estimate the cardinalities and costs of the steps in a query execution plan, which can result in choosing a plan that is suboptimal and has a long query execution time.

Further, the metadata cache 162 comprising the statistics, while it may be accessed by the compiler 130 independently of the database 110, may need to be accessed a number of times concurrently by a plurality of processes executing within the DBMS 10. Thus, the data in the metadata cache 162 is shared in read-only mode by all processes (e.g., compiler processes compiling query execution plans for different queries). If, however, the statistics in the metadata cache 162 require updating as a result of a change to a corresponding table in the database 110, then the process (e.g., query compilation process) that collected the updated statistics and seeks to write the updated data to the statistics in the metadata cache 162 will require an exclusive lock on the relevant metadata cache entry. This approach may lead to inefficiencies in the operation of the DBMS 10: first, in order to obtain this exclusive lock, the process seeking to write to the metadata cache 162 must wait for all other processes to finish reading the entry; then, while it has an exclusive lock and is writing the updated statistics to the metadata cache 162, all other processes must wait for the lock to be released, resulting in slower query execution. Alternatively, rather than delay the compilation and execution of other queries dependent on the same statistics, the process holding the updated statistics may simply throw away the updated statistics, which increases the general overhead of the DBMS 10.

To maintain the database statistics in an updated condition, an automatic statistics collection daemon (not shown) may be implemented in the DBMS 10. The automatic statistics collection daemon may be activated periodically to collect a set of predetermined statistics by querying the database 110 for relevant data and computing statistics from that data, which are then stored in the metadata store 160. In a large and active system, however, it may be difficult to determine the priority and order in which statistics should be collected without overwhelming the database system resources by collecting too many statistics. Further, if the daemon is woken up only on a periodic basis, it may miss a critical window for collecting statistics (for example, shortly before the compiler 130 compiles a complex query where optimization relies on particularly accurate table statistics).

Figure 2:
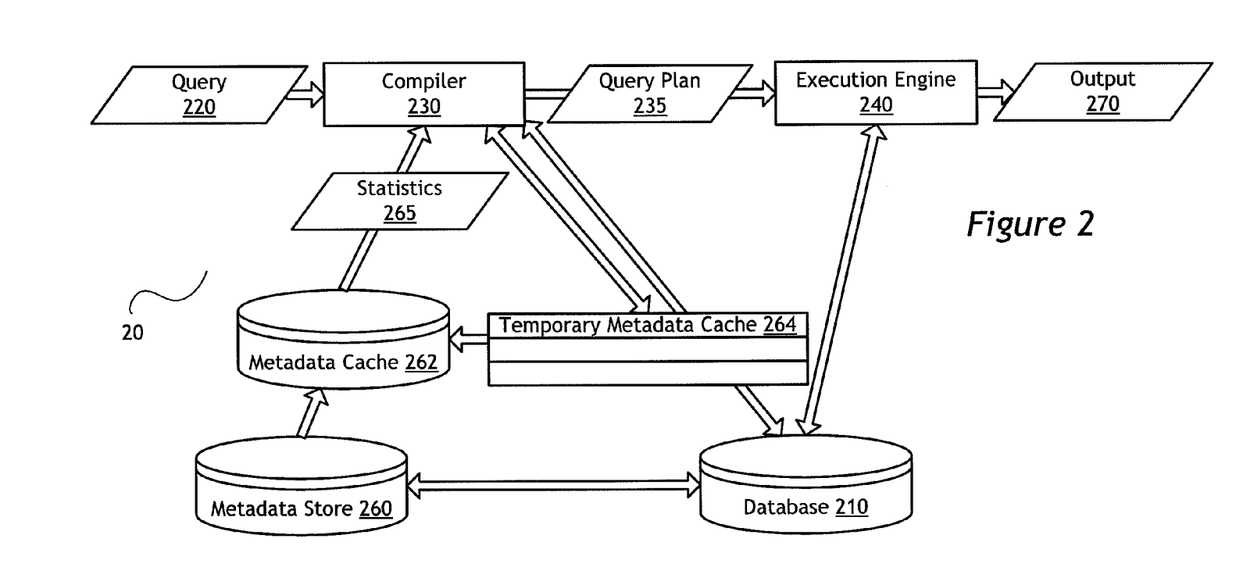
FIG. 2 is a schematic representation of a database management system comprising a metadata store, a metadata cache, and a temporary metadata cache.

Thus, in accordance with the embodiment shown in FIG. 2, a system 20, such as a DBMS, is provided to propagate updated statistics for use by other processes. In this further system, a database 210 is provided. Again, the database 210 may comprise one or more tables containing data (not shown). Statistics and/or other metadata (including metadata relating to stored statistics) for one or more of the tables of the database 210 may be comprised in a store such as a metadata store 260, which, like the metadata store 160 of FIG. 1, may comprise system catalog tables comprised within the database 210 itself. The metadata store 260 may be comprised in a separate store or memory location from the database 210. Statistics, and optionally other metadata, may be loaded into another store, such as a metadata cache 262, from the metadata store 260. A query 220 may be received at the compiler 230 for compiling; as with FIG. 1, the query 220 may have originated within the DBMS 20 or from a client in communication with the DBMS 20. The compiler 230 compiles, using the query 220, a query execution plan or access plan 235. A query optimizer component of the compiler 230 accesses statistics 265 for compiling, which may include optimizing, the query from the metadata cache 262. However, as will be explained below, if valid statistics are not available in the metadata cache 262, then these statistics are either loaded from the metadata store 260 into the metadata cache 262, for retrieval by the compiler 230 from the metadata cache 262; or, if available in another store, for example a temporary metadata cache 264, they are loaded from this other store, or temporary cache 264, into the metadata cache 262 for retrieval by the compiler 230. The temporary metadata cache 264 comprises an intermediate store of statistical data or other metadata for use by not only the compiler process compiling the query 220, but also by other compiler processes that may be compiling other queries. The temporary metadata cache 264 is described in further detail below with reference to FIG. 3.

The system then proceeds in a similar manner as that described with respect to FIG. 1; once the query optimizer has determined the most appropriate query execution plan 235 based on available statistics 265, the query execution plan 235 is passed to the execution engine 240 for execution. The resultant output 270 is then provided to the client or other designated destination.

Figure 3:
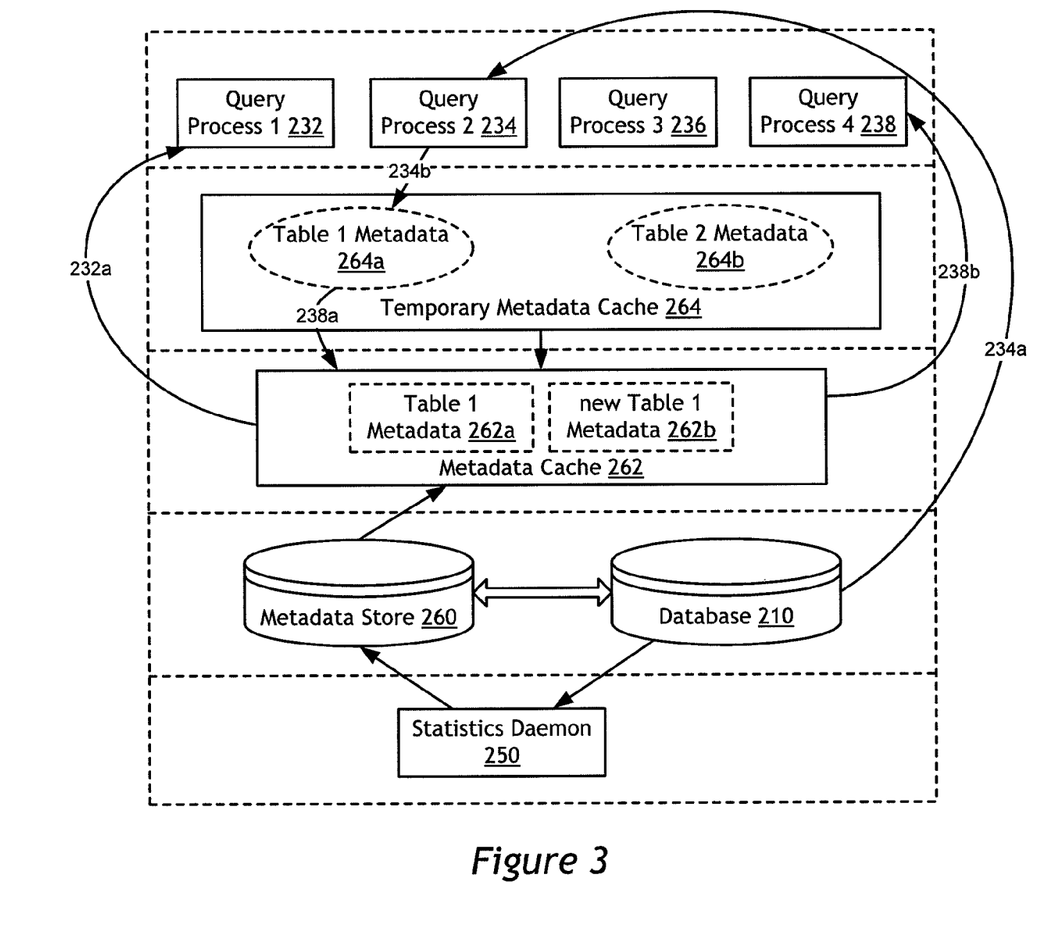
FIG. 3 is a further schematic representation of aspects of the system of FIG. 2.

FIG. 3 further illustrates the system of FIG. 2 where there are multiple concurrent compiler processes that may attempt to access the same set of statistics. A database 210, metadata store 260, and a store such as metadata cache 262, such as those described above, are provided. The database 210 comprises at least one table, and may comprise a plurality of tables, for example, Table 1 and Table 2 (not shown). The metadata cache 262 may be resident in computer memory, and loaded from disk with data from the metadata store 260. Initially, the metadata cache 262 may comprise a first entry of statistics and/or other metadata for Table 1, Table 1 Metadata 262a (the metadata cache 262 may comprise statistics and/or other metadata for other tables in the database 210, not shown in FIG. 3). A first query, Query 1, is received by the compiler, initiating a compilation and optimization process for Query 1, as represented by Query 1 Process 232 in FIG. 3. In the example of FIG. 3, Query 1 requires data from Table 1 in the database 210, and accordingly the optimization process 232 may utilize statistics and optionally other metadata relating to Table 1 to evaluate the most appropriate query execution plan for Query 1. The Query 1 Process 232 first attempts to obtain the required statistics and/or metadata from the metadata cache 262, as shown by arrow 232a. If the metadata cache 262 contains the required statistics and/or metadata for the Query 1 Process 232—for example, the statistics contained in Table 1 Metadata 262a—and these statistics and/or other metadata are valid and sufficiently updated as explained below, then the Query 1 Process 232 may proceed to compile Query 1. If the metadata cache 262 does not contain the required, valid statistics and/or metadata for the Query 1 Process 232 but another store such as the temporary metadata cache 264 comprising these statistics and/or metadata is available, then the process 232 may cause this required data to be loaded from the temporary metadata cache 264 into the metadata cache 262, so that the process 232 may then access the data from the metadata cache 262. In this example, if the metadata cache 262 did not contain valid data in the Table 1 Metadata 262a for the Query 1 Process 232, then the data may be loaded from the Table 1 Metadata 264a comprised within the temporary metadata cache 264; if invalid data for Table 1 was already present in the metadata cache 262, then the cache 262 will now comprise multiple entries of statistics and/or other metadata for Table 1, although only one entry will be valid (an example of this is described in conjunction with the compilation of Query 2, below). If neither the metadata cache 262 nor the temporary metadata cache 264 comprises the required, valid statistics and/or metadata, then the required data may be loaded from the metadata store 260 into metadata cache 262, and the Query 1 Process 232 may then obtain these data from the metadata cache 262.

During or after the compilation of Query 1, the statistics and/or other metadata relating to Table 1 in the database 210, as stored in the metadata cache 262, may change as a result of changes to the database 210, and consequently the statistics and/or other metadata stored in the metadata cache 262 may become stale or out of date. While the compilation or optimization of some queries may not be significantly affected by changes to the underlying database 210, the compilation or optimization of other queries may be sensitive to such changes. Thus, for example, a second query, Query 2, may be received by the compiler and a new process, Query Process 2 234, initiated to compile and optimize a query execution plan for Query 2. Query 2, in this example, likewise requires data from Table 1 in the database 210. Further, a third query, Query 3, may be received by the compiler and a third process, Query Process 3 236, initiated to compile and optimize a query execution plan for Query 3. In the example of FIG. 3, Query 3 relates to two tables in database 210, Table 1 and Table 2. Each of these queries 234, 236 would therefore attempt to obtain any needed statistics from the metadata cache 262, and would normally proceed as described above. The temporary metadata cache 264 may also comprise metadata stored in association with other tables of the database 210, for example Table 2 Metadata 264b; this additional metadata may be the result of a previous update. If the statistics for these other tables obtained by a query from the metadata cache 262 are determined to be valid and sufficiently updated for compiling that query, then data will not be loaded again from that particular set of metadata (e.g., Table 2 Metadata 264b) into the metadata cache 262.

However, one of these subsequent queries, for example Query Process 2 234, may determine that the statistics and/or other metadata it requires for Table 1 that it obtained using the method described above (i.e., Table 1 Metadata 262a from the metadata cache 262), are stale or out of date. If this is the case, then the process 234 may determine whether and how to obtain the updated statistics and/or other metadata it requires. For example, if updated statistics are not required for the Query Process 2 234, but the statistics retrieved are determined to be stale, the Query Process 2 234 may register a request with a statistics daemon 250 to collect new statistics, but will still proceed with the stale statistics for the purpose of query compilation. Alternatively, the Query Process 2 234 may determine that new statistics should be obtained prior to compilation by scanning the table data for Table 1 in the database 210, and computing new statistics, as illustrated by the arrow 234a. If the Query Process 2 234 obtains these new statistics, then any new data thus obtained is then stored by the Query Process 2 234 in the temporary metadata cache 264 as shown by arrow 234b, overwriting any previous corresponding statistics or other metadata that was stored in the temporary cache 264. The corresponding data stored in the metadata cache 262 is then marked by the Query Process 2 234 as invalid, and the Query Process 2 234 proceeds to complete compilation and/or optimization of Query 2 using the new data thus obtained, which may be stored by the Query Process 2 234 in privately accessible memory (i.e., memory not accessible by another compiler process). In a further embodiment, the Query Process 2 234, after storing the updated data in the temporary metadata cache 264, may force a load of the newly-acquired data from the temporary metadata cache 264 into the metadata cache 262. This newly-acquired data would then be stored as a separate entry in the metadata cache 262, illustrated in FIG. 3 as new Table 1 Metadata 262b. The first entry in the metadata cache 262, Table 1 Metadata 262a, would then be marked as invalid, such that only the most recently stored entry, Table 1 Metadata 262b, is valid. Thus, in this further embodiment, metadata cache 262 may comprise multiple statistics and/or other metadata entries for Table 1, although at least one of these multiple entries will be marked as invalid, and only one Table 1 entry will be valid. Invalid entries in the metadata cache 262 may be deleted from the metadata cache 262 as part of a cache space management routine or as a result of a request to load fresh statistics and/or metadata into the metadata cache 262, provided no other query process is accessing any of those invalid entries. By allowing for the creation of multiple entries in the metadata cache 262, query processes with updated metadata entries for loading into the metadata cache 262 need not wait for other processes accessing existing entries for the same metadata to release any latches (e.g., a share latch) on the data.

A determination of whether the statistics or other metadata retrieved by a process need to be updated may be implemented by any means known to those skilled in the art. As an example, which is not meant to be limiting, a simple aging rule may be applied, such that statistics in the metadata cache 262 with a timestamp older than a predetermined limit are deemed to be out of date, and in need of updating. Alternatively, a statistic may be deemed to be in need of updating after it has been accessed a predetermined number of times. A further method for determining whether a cached statistic is stale and in need of updating is described with reference to FIG. 6, below.

Figure 4:
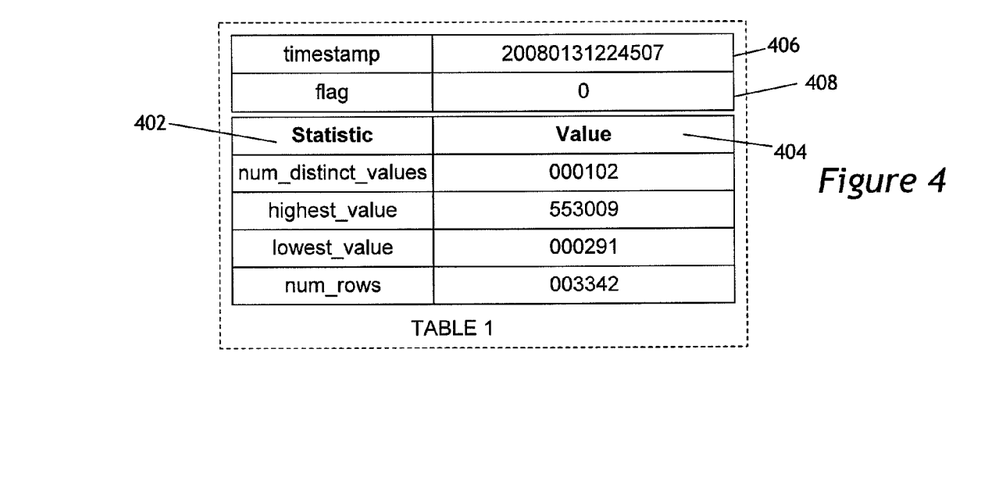
FIG. 4 is a representation of data in the metadata cache of FIG. 3.

A possible schematic arrangement of Table 1 metadata in the metadata cache 262 of FIG. 4 illustrates that the metadata cache 262 comprises a timestamp 406 reflecting the time and/or date of collection or verification of the statistics and/or metadata in the metadata cache 262, as well as a flag 408 indicating whether the statistics and/or metadata is valid; this flag 408 may be altered by a query process, such as the Query Process 2 234 in the example of FIG. 3. In this example, a '0' may indicate that the data is valid, and a '1' or non-zero value may indicate that the data is invalid; however, the selection of appropriate formats and values for the flag 408 may be made by a person of ordinary skill in the art. In a further embodiment, the validity of statistics and/or metadata may be recorded with more granularity; for example, each statistical and/or metadata value may be provided with an associated flag indicating whether each value is valid or invalid. The timestamp 406 may be substituted with an appropriate counter value, if the statistic is to be updated after a certain number of accesses. For each statistic or other metadata cached in the metadata cache 262, there may be an identifier 402 for identifying the type of statistic or metadata stored in the metadata cache 262 as well as a corresponding value 404.

Returning to FIG. 3, Query Process 2 234 may also cause the updated statistics stored in the temporary metadata cache 264 to be persisted to the metadata store 260. While the Query Process 2 234 itself may persist the updated statistics to the store 260, in a preferred embodiment the Query Process 2 234 registers a request with another process, such as the statistics daemon 250, for the process to persist the updated statistics to the metadata store 260.

Query Processes 1 and 3 (232 and 236, respectively), may proceed to complete optimization using the existing data in the metadata cache 262, which may have since been marked as invalid by Query Process 2 234. Query Process 3 236 will also use the existing data in the metadata cache 262 for Table 2, which in this example is not updated with new statistical data. After Query Process 2 234 has marked the Table 1 metadata in the metadata cache 262 as invalid, Query Process 4 238 may be initiated by the compiler in response to a subsequently received Query 4, and may require statistical data for Table 1 of database 210. As described above, the Query Process 4 238 first accesses the metadata cache 262. If it determines that it requires statistics and/or metadata in the metadata cache 262 that have since been marked as invalid, then Query Process 4 238 may cause the required statistics to be loaded from the temporary metadata cache 264 into the metadata cache 262, as indicated by arrow 238a, so that the Query Process 4 238 may thus load the required statistics from the metadata cache 262, as indicated by arrow 238b. Thus, Query Process 4 238 will compile Query 4 using more recent statistics than those stored in the metadata cache 262, and without having to obtain newer statistics itself from the database 210.

Figure 5:
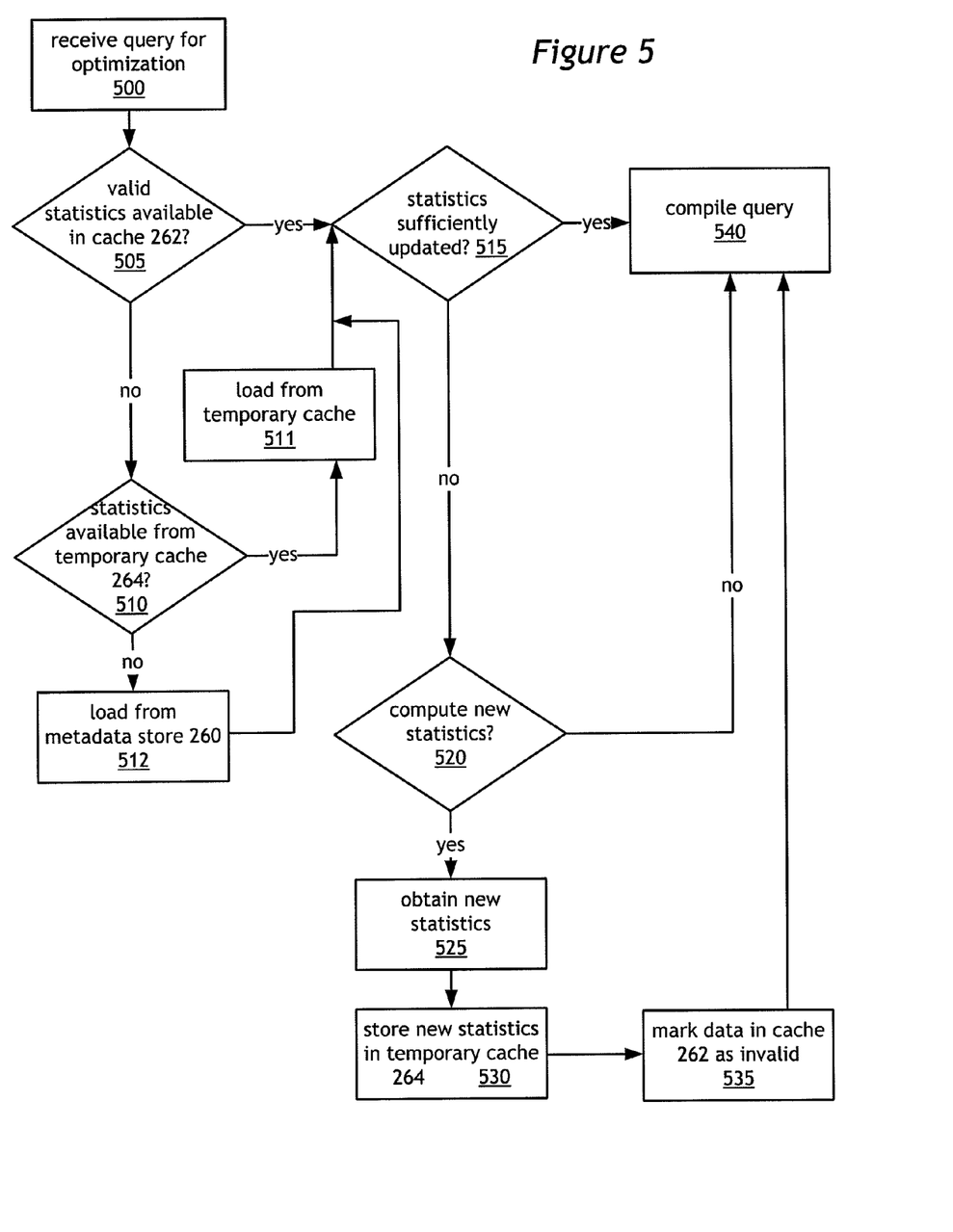
FIG. 5 is a flowchart representation of a method for updating statistics and/or other metadata in the system of FIG. 2.

This process is further illustrated in FIG. 5. At block 500, a query is received for optimization by the compiler 230, and a query process is initiated for compiling and/or optimizing the query. At block 505, a determination is made whether valid statistics and/or other metadata are available in the metadata cache 262 for compiling and/or optimizing the query; if there are, and if these statistics and/or other metadata are determined to be sufficiently up to date for the purpose of compiling the query at block 515, then the query process obtains the statistics and/or other metadata and compiles the query at block 540. If, however, valid statistics and/or other metadata are not available at the metadata cache 262, then the query process determines whether the required data is available from a temporary cache 264 at block 510. If the required data is available from the temporary cache 264, then the data is loaded from the temporary cache 264 into the metadata cache 262 at block 511. If the required data is not available from the temporary cache 264—for example, if the temporary cache 264 does not comprise statistics and/or other metadata for the table or tables relevant to the query then the required data may be loaded from the metadata store 260 into the metadata cache 262 at block 512.

The query process then determines whether this data (whether retrieved indirectly from the metadata store 260 or the temporary metadata cache 264) is sufficiently updated at block 515; if so, then the query process compiles the query at block 540.

If, however, it is determined at 515 that the data retrieved is not sufficiently up to date for use by the query process, then the query process makes a determination at block 520 whether to compute new statistics. If the query process determines that new statistics and/or other metadata are not required for the purpose of compiling the present query, the process proceeds to block 540; however, the process may also schedule the statistics daemon 250 to collect new statistics, which will be used to update the metadata store 260. If the query process determines that new statistics and/or other metadata are required, then it may proceed to obtain these new statistics and/or other metadata by scanning the database 210, and computing data as required at block 525. The query process registers a request with the temporary metadata cache 264 indicating that it will be collecting statistics (and/or other metadata) for the relevant table or tables for the query. Other query processes that subsequently access the temporary cache 264 will thus be able to determine whether the statistics and/or other metadata they require are in the process of being updated. In one embodiment, when a first query process registers a request indicating that it will collect statistics and/or other metadata, another query process may have in the meantime stored new statistics in the temporary metadata cache 264 since the first query process had determined that new statistics and/or metadata were required. If the temporary metadata cache 264 comprises more updated statistics and/or metadata, which may be determined by comparing the associated timestamp 406 in the temporary metadata cache 264 with the time of the first query process's request, then the request from the first query process may be rejected, and the new statistics and/or metadata returned to the first query process instead. Other methods of handling concurrent or near-concurrent query processes operating on the same metadata and/or statistics may be implemented, and will be understood by those skilled in the art.

The query process then stores these newly-collected data in the temporary cache 264 at block 530, and indicates to the temporary metadata cache 264 that collection has been completed. The existing corresponding data in the metadata cache 262 is then marked as invalid at block 535. The query process may then proceed to compile and/or optimize the query at block 540.

It will be appreciated by those skilled in the art that the foregoing system provides a mechanism for prioritizing and asynchronously triggering statistics collection for use by subsequent queries. Updated statistics and/or other metadata are stored in temporary metadata cache 264 as required, as query processes determine that the cached statistics in the metadata cache 262 and/or the metadata store 260 are stale. Further, as new statistics and/or other metadata are collected by the various processes, they are also persisted to the metadata store 260. The foregoing system for updating statistics in the DBMS 20 also reduces the likelihood of redundant statistics computation and collection by concurrently-running query processes, because a subsequently-initiated process may determine from the temporary metadata cache 264 whether another query has already commenced new statistics collection from the database 210. The subsequently-initiated query may then obtain the newly-collected statistics indirectly from the metadata store 260, once the newly-collected statistics are persisted to the metadata store 260, or indirectly from the temporary metadata cache 264.

Figure 6:
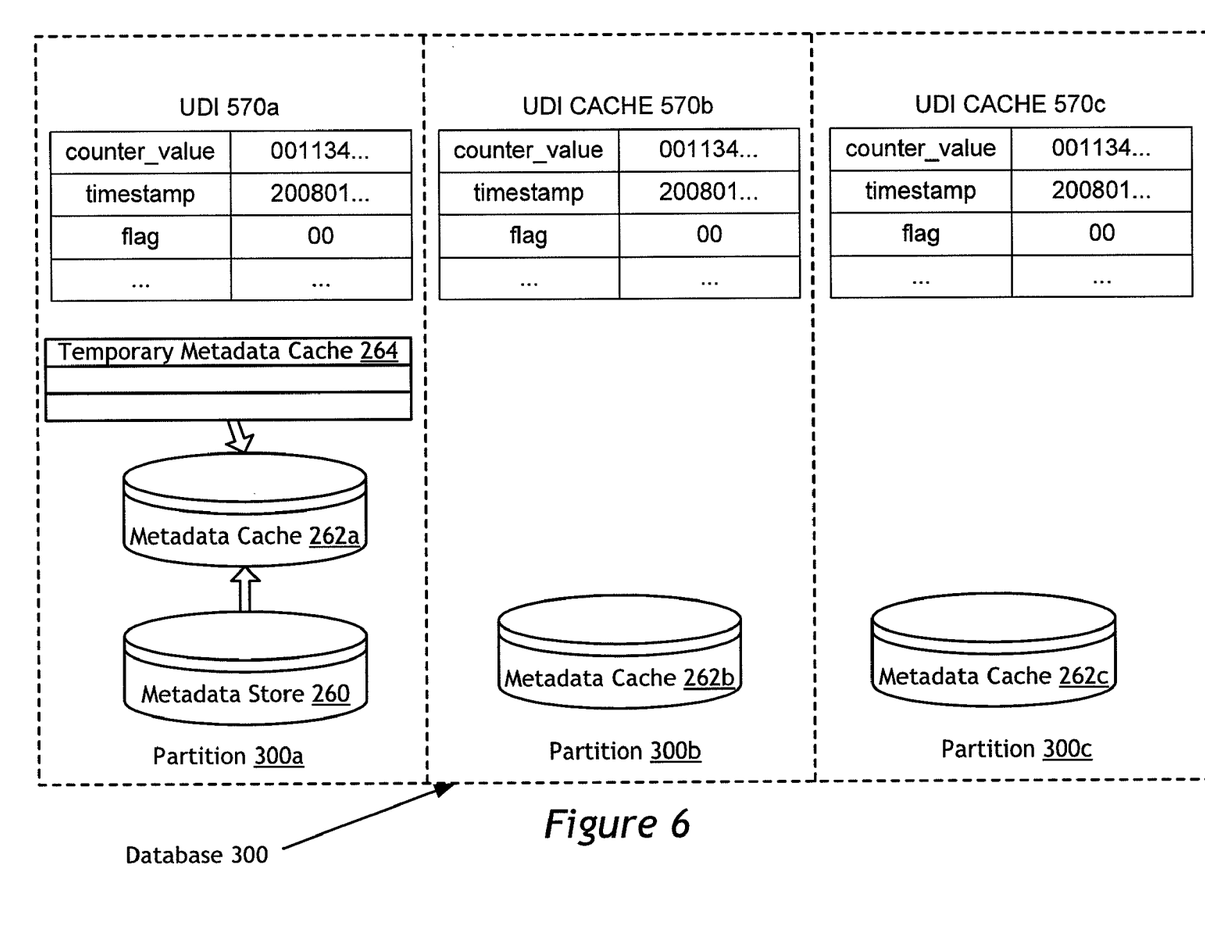
FIG. 6 is a schematic representation of a partitioned database system with corresponding metadata in the database management system of FIG. 2.

The foregoing embodiment may also be employed in a DBMS 20 for propagating updated statistics that may be accessed across multiple partitions in the database 210 so that the entire system may benefit from the updated statistics. It will be appreciated by those skilled in the art that a database may be distributed across multiple partitions. In the prior art, statistics collection by various query processes may be conducted independently in each partition, resulting in possible duplication of statistics collection efforts, thus adding to the overhead of the DBMS 20. However, in the implementation of the embodiment described above, statistical data may be cached and accessible across all partitions of the database. Updates to the temporary metadata cache are therefore not restricted to a single partition. As shown in FIG. 6, a database 300 is partitioned across three partitions, 300a, 300b, and 300c. In the schematic of FIG. 6, partition 300a is a catalog partition, at which metadata (including statistics) is stored, for example metadata cache 262a. The other partitions may store other metadata caches 262b and 262c. These caches are similar to the metadata cache 262 of FIGS. 2 and 3. The catalog partition 300a also comprises the temporary metadata cache 264 and the metadata store 260. The statistics daemon 250 (not shown in FIG. 6) may persist updated statistics and/or other metadata from the temporary metadata cache 264 to the metadata store 260, and the data in the temporary metadata cache 264 may be loaded into the metadata caches 262a, 262b, and 262c.

A method for determining whether statistics for a particular table in a database 300 require updating is also provided. The level of activity in row modification in a given table may serve as an indicator of the freshness of statistics previously collected for that table; thus, a statistic value such as a count of the number of rows that have been updated, deleted, and inserted in a table may be used to determine whether previously collected statistics are now stale. For example, if the count exceeds a predetermined limit, the system may deem the statistics associated with the table as being stale. The updated-deleted-inserted ("UDI") row counts may be recorded separately, or tracked in a single counter value.

If the database 300 is distributed across multiple partitions, then the statistic value or values—here, the UDI counter value or values—for a given table may be maintained independently for each partition in which the table is stored. In that case, a query process, requiring UDI data to determine whether the cached statistics for a given table in the database are sufficiently up to date, must retrieve and combine (for example, by summing) the UDI data for that table from each of those partitions where the table resides. Retrieving UDI data from each relevant partition may slow compilation of a query execution plan, particularly when there are delays in network communication between the partitions. If there is a large number of queries to be compiled referencing that particular table, then significant overhead may be added to the retrieval of the UDI data.

Accordingly, in the embodiment shown in FIG. 6, the UDI data for a given table is cached at each database partition where a query may be compiled. UDI data 570a is stored on the first partition 300a. A cached copy of the UDI data 570b is stored on partition 300b, and a cached copy of the UDI data 570c is stored on partition 300c. In the embodiment depicted in FIG. 6, the UDI data 570a, 570b, 570c comprises at least one counter value "counter_value"; here, the single counter value represents the updated, deleted, and inserted rows in Table 1, a timestamp, and a flag value. The flag value is used to indicate whether updated UDI data is being captured; for example, a "00" value may indicate that data is not being captured, whereas a value that is not equal to "00" may indicate that data is being captured. The flag, of course, may take another format, provided it is capable of identifying at least these two states. By maintaining a cached copy of the UDI data (and of other metadata, such as Table 1 Metadata 500b, 500c) on different partitions, a faster determination of the "staleness" or validity of the stored statistics or other metadata can be made.

Figure 7:
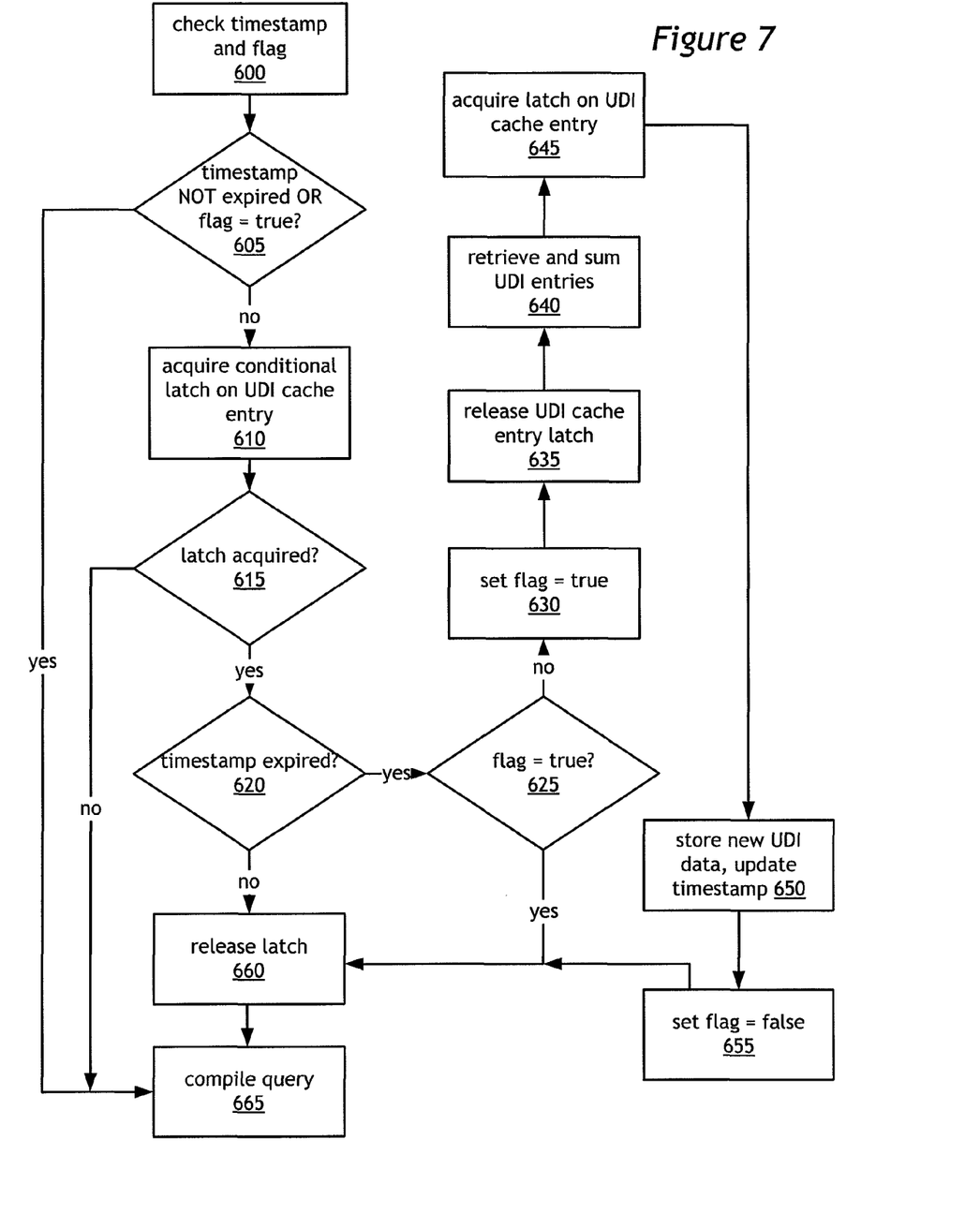
FIG. 7 is a flowchart representation of a method for updating statistics and/or other metadata in the system of FIG. 6.

The process of updating the UDI data may be understood with reference to FIG. 7. When a query process at a given partition determines that it requires UDI data for a given table for compiling or optimizing a query, the process first accesses the cached UDI data at its partition. At block 600, the process checks the timestamp of the UDI data and the corresponding flag value. If it is determined at block 605 that the timestamp is not expired, or that the flag value is equal to TRUE (in this embodiment, TRUE signifies that updated UDI data is being captured by another process; in other embodiments, the TRUE value may correspond to the state in which UDI data is not currently being captured, or alternatively values other than TRUE and FALSE may be used to indicate whether UDI data is in the process of being captured or not), then the process moves to block 655, and proceeds to compile the query with the UDI data read at the initial access.

Otherwise, the process proceeds to acquire a latch on the UDI cache entry, obtain fresh UDI statistics, and update the cached UDI data. This updating process may follow the flow of FIG. 7, beginning at block 610, where the process attempts to acquire a conditional latch on the UDI cache entry. If the latch is not successful at block 615, then the process moves to block 655, and proceeds to compile the query with the UDI data read at the initial access. If the latch is successfully acquired, then the process may determine at block 620 whether the timestamp is expired. If the timestamp is not expired, then the process may then release the latch 660 and proceed to compile the query at 665. If the timestamp is expired, the process then determines at block 625 whether the flag value is set to TRUE; if so, another process may have updated the UDI data prior to the present process's acquisition of the latch at block 610. The present process may then release the latch 660 and proceed to compile the query at 665, since updated UDI data is available.

If, however, the timestamp is determined to be expired at block 620 and the flag value is FALSE, then the process sets the flag value to TRUE at block 630 and releases the latch at block 635; thus, further processes compiling other queries that may access the cached UDI data on this partition will see that the UDI data is in the process of being updated, and will continue compiling the other queries without waiting for updated UDI data. This avoids delay in the compilation of other queries, thus reducing system overhead.

The process then moves to block 640, where it retrieves and sums UDI entries from each database partition 300a, 300b, 300c on which the table is resident to obtain updated UDI data. The process then acquires a latch on the UDI cache entry at block 645, stores the updated UDI data and updates the timestamp at block 650, and sets the flag value to FALSE at block 655 before releasing the latch at block 660. The process then proceeds to complete compilation of the query at block 665 with the updated UDI data.

It will be appreciated by those skilled in the art that because the cached UDI data is stored with other table metadata on the database partition, the UDI data, timestamp, and flag may be reset whenever the metadata cache on that partition is reloaded. Further, the overhead on the partition 300a containing the UDI data is reduced, since calls on that UDI data will be reduced; instead, query processes on other partitions may retrieve the cached UDI data 570b, 570c. The UDI data for a given table need not be cached on each and every database partition on which the table resides; caches may be maintained only on select partitions.

Thus, the foregoing embodiments provide a system, such as a DBMS, that suitably propagates and makes permanent on disk newly collected statistics for tables in a database, as those statistics are updated in response to the requirements of query processes. The foregoing embodiments also provide a mechanism to prioritize and asynchronously trigger statistics collection while reducing system overhead.

Although not illustrated in FIGS. 1 to 7, the DBMS 10 or 20 may include additional components, not shown, such as database administration or maintenance modules. Further, the components of the DBMS 10 or 20 may be remotely located from one another, and one or more of the components may also include sub-components that are not shown. For example, the compiler 130 or 230 may comprise a parser or other components.

Figure 8:
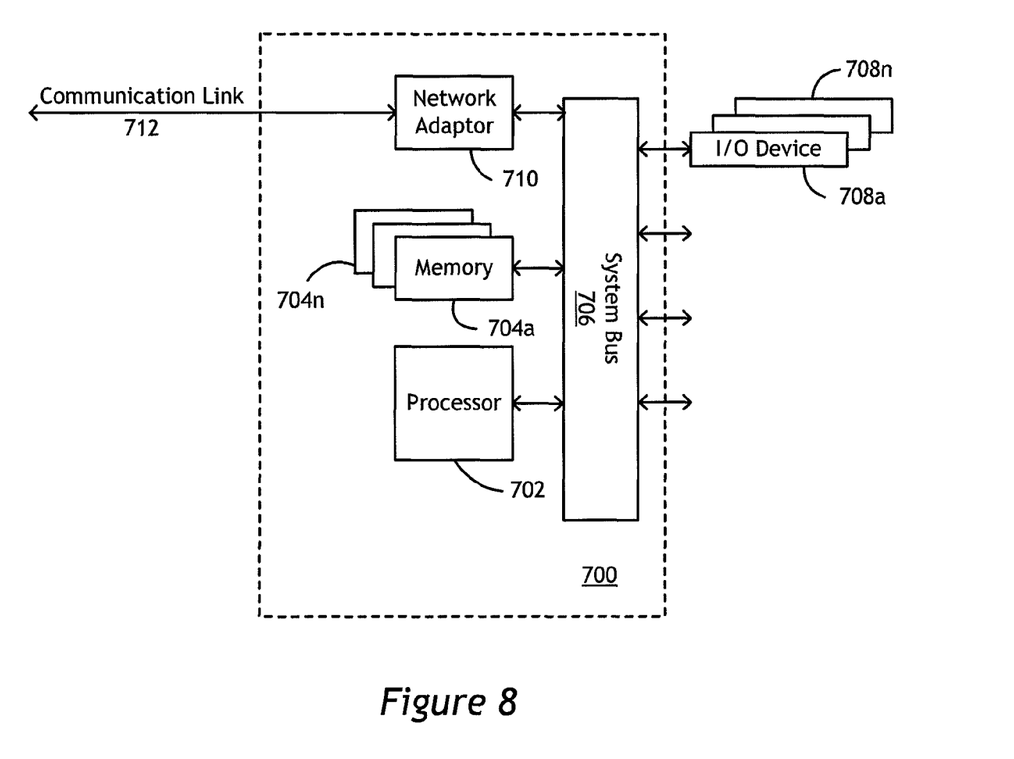
FIG. 8 is a block diagram of a computer system for implementing the system of FIG. 2 or the method of FIG. 7.

The systems described herein may be implemented on a data processing system 700, such as that depicted in FIG. 8. The data processing system 700 is suitable for storing and/or executing program code. The data processing system 700 may include a processor 702, coupled to memory elements 704a through $n$ via a system bus 706. The data processing system 700 may comprise a plurality of processors 702, coupled directly or indirectly to memory elements through a system bus. The memory elements 704 a through n may include volatile and non-volatile data storage units, including read-only memory and random access memory components, hard drives, optical storage media, and other readable and read-writable storage media, and may include local memory employed during actual execution of the program code, bulk storage, and cache memories which provide temporary storage of at least some program code in order to reduce the number of times code must be retrieved from bulk storage during execution. The metadata caches and subsets described herein may be stored on one or more of the memory elements 704a through $n$ as well. In addition, input/output devices 708a through $n$, which may include keyboards, displays, pointing devices, and the like, are also coupled to the data processing system 700, directly or indirectly through intervening input/output controllers (not shown). In a data processing system, the components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A network adaptor 710 may be provided, coupled to the data processing system 700 for enabling communication between the system 700 and other data processing systems, remote printers, client devices, or storage devices, via communication link 712. Communication link 712 may be a fixed or wireless connection, over either a private or public local or wide area network. Modems, cable modem and Ethernet cards are just a few of the currently available types of network adapters.

The systems and methods disclosed herein are presented only by way of example and are not meant to limit the scope of the invention. Other variations and modifications of the systems and methods described above will be apparent to those skilled in the art and as such are considered to be within the scope of the invention, which includes all such variations and modifications as fall within the scope of the appended claims. For example, it should be understood that acts and the order of the acts in the processing described herein may be altered, modified and/or augmented, or that said acts may be carried out by software and/or hardware modules designed for such purpose, and still achieve the desired outcome.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The systems' and methods' data may be stored in one or more media. The media can be comprised in many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program. Media can be an electronic, magnetic, optical, electromagnetic, infrared, or semiconductor system (or apparatus or device). In a further embodiment, a propagation medium may be utilized. Examples of a computer-readable medium that are not intended to be limiting include a semiconductor or solid state memory, magnetic tape, a removable computer diskette, a random access memory (RAM), a read-only memory (ROM), a rigid magnetic disk and an optical disk. Current examples of optical disks include compact disc-read only memory (CDROM), compact disc-read/write (CD-R/W) and DVD.

Various embodiments of the present invention having been thus described in detail by way of example, it will be apparent to those skilled in the art that variations and modifications may be made without departing from the invention. The invention includes all such variations and modifications as fall within the scope of the appended claims.

The invention claimed is:

1. A method for updating database statistics for use in generating query execution plans, comprising:
  receiving a first query for a table in a database;
  determining whether valid and updated statistics for compiling the first query are available from a first store comprising a first entry with statistics associated with the table in the database;
  if valid and updated statistics for compiling the first query are not available from the first store, obtaining updated statistics from a further store comprising statistics associated with the table in the database; and
  storing the obtained updated statistics associated with the table in the database in the first store as a second entry, thereby storing multiple entries for the statistics associated with the same table in the database,
  wherein the first store is a metadata cache and the further store is a temporary cache.

2. The method of claim 1, wherein obtaining updated statistics from the further store comprises:
  determining whether sufficiently updated statistics for compiling the first query are available from a second store comprising statistics associated with the table in the database;
  if sufficiently updated statistics for compiling the first query are not available from the second store,
    collecting the updated statistics from the database,
    storing the updated statistics in the second store, and
    retrieving the updated statistics for compiling the first query from the second store.

3. The method of claim 2, wherein retrieving the updated statistics for compiling the first query from the second store comprises loading the updated statistics from the second store into the first store, and retrieving the updated statistics from the first store.

4. The method of claim 2, wherein the first store further comprises an indicator for indicating whether the statistics are valid.

5. The method of claim 4, further comprising:
  upon storing the updated statistics in the second store, altering the indicator associated with corresponding statistics in the first store to indicate that the corresponding statistics are invalid.

6. The method of claim 1, wherein obtaining updated statistics from a further store comprises:
  determining whether sufficiently updated statistics for compiling the first query are available from a second store comprising statistics associated with the table in the database;
  if sufficiently updated statistics for compiling the first query are not available from the second store,
    retrieving the updated statistics from a third store comprising statistics associated with the table in the database;
    storing the updated statistics in the first store as the second entry; and
    retrieving the updated statistics for compiling the first query from the second entry in the first store.

7. The method of claim 1, wherein obtaining updated statistics from a further store comprises:
  determining whether sufficiently updated statistics for compiling the first query are available from a second store or a third store comprising statistics associated with the table in the database;
  if sufficiently updated statistics for compiling the first query are not available from the second store or the third store,
    collecting the updated statistics from the database,
    storing the updated statistics in the second store, and
    retrieving the updated statistics for compiling the first query from the second store.

8. The method of claim 7, wherein retrieving the updated statistics for compiling the first query from the second store comprises loading the updated statistics from the second store into the first store, and retrieving the updated statistics from the first store.

9. The method of claim 8, wherein the first store further comprises an indicator for indicating whether the statistics are valid, the method further comprising:
  upon storing the updated statistics in. the second store, altering the indicator associated with corresponding statistics in the first store to indicate that the corresponding statistics are invalid.

10. The method of claim 1, wherein, only one of the multiple entries is valid, while all other of the multiple entries are invalid.

11. A system for updating database statistics for use in generating query execution plans, the system comprising:
  a database;
  a first store comprising statistics associated with a table in the database;
  a second store comprising a first entry with statistics associated with the table in the database; and
  a compiler in communication with the database and with at least the first store, the compiler being configured for receiving queries for the table in the database, accessing statistics for compiling each query from at least the first store, and generating at least one query execution plan for executing each query, wherein the compiler is further configured to:
  determine whether valid and updated statistics for compiling a first query are available from the first store;
  if valid and updated statistics for compiling the first query are not available from the first store, obtain updated statistics from the second store; and
  store the obtained updated statistics associated with the table in the database in the first store as a second entry, thereby storing multiple entries for the statistics associated with the same table in the database,
  wherein the first store is a metadata cache and the second store is a temporary cache.

12. The system of claim 11, wherein the compiler is further configured to obtain updated statistics from the second store by causing the updated statistics to be loaded from the second store into the first store, and retrieving the updated statistics from the first store.

13. The system of claim 11, further comprising a third store comprising statistics associated with the database, and wherein the compiler is further configured to obtain updated statistics from the second store by:

determining whether sufficiently updated statistics for compiling the first query are available from the second store or the third store;

if sufficiently updated statistics for compiling the first query are not available from the second store or the third store, collecting the updated statistics from the database, storing the updated statistics in the second store, and retrieving the updated statistics for compiling the first query from the second store.

14. The system of claim 13, wherein the compiler is further configured to retrieve the updated statistics for compiling the first query from the second store by loading the updated statistics from the second store into the first store, and retrieving the updated statistics from the first store.

15. The system of claim 11, wherein, only one of the multiple entries is valid, while all other of the multiple entries are invalid.

16. A computer program product comprising a computer-readable medium, the computer-readable medium being encoded with a computer program for updating database statistics, wherein the computer program, when executed on a computer system, causes the computer system to:

receive a first query for a table in the database;

determine whether valid and updated statistics for compiling the first query are available from a first store comprising a first entry with statistics associated with the table in the database;

if valid and updated statistics for compiling the first query are not available from the first store, obtain updated statistics from a further store comprising statistics associated with the table in the database; and store the obtained updated statistics associated with the table in the database in the first store as a second entry, thereby storing multiple entries for the statistics associated with the same table in the database, wherein the first store is a metadata cache and the further store is a temporary cache.

17. The computer program product of claim 16, wherein, only one of the multiple entries is valid, while all other of the multiple entries are invalid.

18. The computer program product of claim 16, further causes the computer system to:

determine whether sufficiently updated statistics for compiling the first query are available from a second store comprising statistics associated with the table in the database;

if sufficiently updated statistics for compiling the first query are not available from the second store, collect the updated statistics from the database, store the updated statistics in the second store, and retrieve the updated statistics for compiling the first query from the second store.

19. The computer program product of claim 18, wherein the first store further comprises an indicator for indicating whether the statistics are valid.

20. The computer program product of claim 19, further causes the computer system to:

upon storing the updated statistics in the second store, alter the indicator associated with corresponding statistics in the first store to indicate that the corresponding statistics are invalid.

21. The computer program product of claim 16, further causes the computer system to:

determine whether sufficiently updated statistics for compiling the first query are available from a second store comprising statistics associated with the table in the database;

if sufficiently updated statistics for compiling the first query are not available from the second store, retrieve the updated statistics from a third store comprising statistics associated with the table in the database;

store the updated statistics in the first store as the second entry; and retrieve the updated statistics for compiling the first query from the second entry in the first store.

22. The computer program product of claim 16, further comprises causing the computer system to:

determine whether sufficiently updated statistics for compiling the first query are available from a second store or a third store comprising statistics associated with the table in the database;

if sufficiently updated statistics for compiling the first query are not available from the second store or the third store, collect the updated statistics from the database, store the updated statistics in the second store, and retrieve the updated statistics for compiling the first query from the second store.

* * * * *